(12) United States Patent
Li et al.

(10) Patent No.: US 8,922,678 B2
(45) Date of Patent: Dec. 30, 2014

(54) ELECTRONIC APPARATUS, IMAGE CAPTURING APPARATUS, AND METHOD THEREOF

(75) Inventors: Yun-Chin Li, New Taipei (TW);
Yu-Ming Cheng, Hsinchu (TW);
Chin-Lung Yang, Toufen Township (TW)

(73) Assignee: Altek Corporation, Hsinchu (TW)

( * ) Notice: Subject to any disclaimer, the term of this patent is extended or adjusted under 35 U.S.C. 154(b) by 853 days.

(21) Appl. No.: 13/084,160

(22) Filed: Apr. 11, 2011

(65) Prior Publication Data

US 2012/0086836 A1    Apr. 12, 2012

(30) Foreign Application Priority Data

Nov. 22, 2010   (TW) ............................... 99140223 A (51) Int. Cl.
*H04N 5/217*     (2011.01)
*H04N 5/232*     (2006.01)

(52) U.S. Cl.
CPC ....... *H04N 5/23277* (2013.01); *H04N 5/23254* (2013.01)
USPC .......................................... 348/241; 348/364

(58) Field of Classification Search
USPC .................................................. 348/364, 241
See application file for complete search history.

(56) References Cited

U.S. PATENT DOCUMENTS

2004/0145673 A1*   7/2004  Washisu ........................ 348/364

FOREIGN PATENT DOCUMENTS

| CN | 1777238 A | 5/2006 |
|---|---|---|
| CN | 1946192 A | 4/2007 |
| CN | 101150665 A | 3/2008 |

* cited by examiner

*Primary Examiner* — Joel Fosselman
(74) *Attorney, Agent, or Firm* — Wang Law Firm, Inc.; Li K. Wang; Stephen Hsu (57) ABSTRACT

The present invention discloses an electronic apparatus, an image capturing apparatus and a method thereof. The image capturing method comprises the following steps of: capturing a plurality of temporal images by an image capturing module, and setting one of the temporal images as a base image by a processing module; dividing each temporal image into a plurality of temporal image blocks, and dividing the base image into a plurality of base image blocks by the processing module; determining whether the difference between each temporal image block and the corresponding base image block is lower than a threshold value by the processing module; integrating the temporal image block and the corresponding base image block to generate a final image by the processing module when the difference between the temporal image block and the corresponding base image block is lower than the threshold value.

10 Claims, 7 Drawing Sheets

ELECTRONIC APPARATUS, IMAGE CAPTURING APPARATUS, AND METHOD THEREOF

BACKGROUND OF THE INVENTION

1. Field of the Invention

The present invention relates to an electronic apparatus, an image capturing apparatus and a method thereof, and more particularly to an electronic apparatus, an image capturing apparatus and a method thereof, capable of partially filtering an image for image combination in order to reduce noises and output clear images.

2. Description of the Related Art

While photographing by using traditional digital cameras, user usually obtains a blurred image due to his/her hand vibration while taking pictures. As the digital camera is designed with a smaller volume and a lighter weight, the possibility of causing hand vibrations becomes higher, particularly when users press the shutter of a compact camera. The level of hand vibrations will affect the quality of the photos taken, and the angle of the images and the resulted photo may be deviated in a minor case, and blurred images may be resulted in a severe case. Obviously, the hand vibration is one of the major issues that require feasible solutions.

Various traditional vibration reduction mechanisms are applied, for example, mechanism of moving the lens to compensate the vibration of the camera, mechanism of controlling aperture values and shutter speeds to reduce the hand vibrations, and the mechanism of performing signal process to the captured images for resuming the clarity of the images. The aforementioned optical vibration reduction mechanism moves a lens or an image sensor horizontally or vertically to correct the tilt caused by the hand vibrations, but such reverse correction usually generates blurred images in the status of no hand vibration. The digital vibration reduction mechanism also generates blurred images due to the correction of the vibrations by means of related algorithms and image processing methods.

As to the digital vibration reduction mechanism, manner of multiple exposures is usually applied to reduce noises in order to take a clear and low-noise image under the conditions of a low ambient illumination and a severe hand vibration. If it is necessary to obtain a high-quality output image, each image must be corrected geometrically, so that each image can be combined point by point precisely, and then an image processing technique is used to remove and process the noises after the images are corrected geometrically, so as to generate the low-noise and clear images. However, a filter mechanism used to eliminate an inappropriate image is not included in Traditional multiple exposure technique. As a result, the quality of the captured images is inconsistent, and both of the good and bad images are processed in the noise removal process, and erroneous images may be processed in the same manner as good images, and the quality of the output images will be low. Sometimes, the quality of the output images is even lower than that of taking the photo by a single exposure technique.

SUMMARY OF THE INVENTION

Therefore, it is a primary objective of the present invention to overcome the aforementioned shortcomings of the prior art including the inconsistence and the low quality of the output images by providing an electronic apparatus, an image capturing apparatus and a method thereof.

To achieve the foregoing objective, the present invention provides an image capturing apparatus, comprising an image capturing module and a processing module. The image capturing module is provided for capturing a plurality of temporal images. The processing module is provided for setting one of the temporal images as a base image, dividing each temporal image into a plurality of temporal image blocks, and dividing the base image into a plurality of base image blocks. The processing module further determines whether or not the difference between each temporal image block and the corresponding base image block is smaller than a threshold value. If the difference between one of the temporal image blocks and one of the corresponding base image blocks is smaller than the threshold value, the processing module will perform an image combination of the temporal image block with the corresponding base image block to generate an output image.

The threshold value includes a first threshold value, and the processing module further performs a geometric alignment of each base image block with each corresponding temporal image block and calculates a first error value. If the first error value is smaller than the first threshold value, the processing module will combine the base image block with the corresponding temporal image block.

The threshold value also includes a second threshold value, and the processing module further uses a histogram of each base image block and each temporal image block to determine whether or not a second error value between each base image block and each corresponding temporal image block is smaller than the second threshold value. If the second error value is smaller than the second threshold value, the processing module will combine the base image block with the corresponding temporal image block.

If the difference between one of the temporal image blocks and one of the base image blocks is greater than or equal to the threshold value, the processing module will compensate the brightness of the output image by a digital gain compensation method or a temporal interpolation method.

To achieve the foregoing objective, the present invention further provides an image capturing method, comprising: the steps of capturing a plurality of temporal images by an image capturing module; setting one of the temporal images as a base image by a processing module, dividing each temporal image into a plurality of temporal image blocks, and dividing the base image into a plurality of base image blocks by the processing module; determining whether or not the difference between each temporal image block and one of the corresponding base image blocks is smaller than a threshold value by the processing module; and combining the temporal image block with the corresponding base image block to generate an output image by the processing module, if the difference between one of the temporal image blocks and one of the corresponding base image blocks is smaller than a threshold value.

The threshold value includes a first threshold value, and the image capturing method further includes the steps of performing a geometric alignment of each base image block with each corresponding temporal image block and calculating a first error value. The processing module determines whether or not each first error value is smaller than a first threshold value. If the first error value is smaller than the first threshold value, the processing module will combine the base image block with the corresponding temporal image block.

The threshold value also includes a second threshold value, and the image capturing method further comprises the steps of using a histogram of each base image block and each temporal image block to determine whether or not a second error value between each base image block and each corresponding temporal image block is smaller than the second threshold value. If the second error value is smaller than the second threshold value, the processing module will combine the base image block with the corresponding temporal image block.

The image capturing method further comprises the step of compensating the brightness of the output image by means of a digital gain compensation method or a temporal interpolation method by the processing module, if the difference between one of the temporal image blocks and one of the base image blocks is greater than or equal to threshold value.

To achieve the foregoing objective, the present invention further provides an electronic apparatus comprising a main body and the aforementioned image capturing apparatus installed in the main body.

The electronic apparatus is a digital camera, a mobile phone with a photographic function, a personal digital assistant (PDA) with a photographic function or a tablet personal computer with a photographic function.

The electronic apparatus and the image capturing apparatus of the present invention and the method thereof have one or more of the following advantages:

(1) In the electronic apparatus and the image capturing apparatus of the present invention, and the method thereof, small blocks are used for geometrically aligning the temporal images, and an alignment error is used for filtering any temporal image block of a poor quality to improve the clarity of the output image after the image combination takes place.

(2) In the electronic apparatus and the image capturing apparatus of the present invention and the method thereof, the small blocks are used for analyzing the histogram of each temporal image, and the error is used for filtering any temporal image block of a poor quality to improve the clarity of the output image after the image combination takes place.

DETAILED DESCRIPTION OF THE PREFERRED EMBODIMENTS

The foregoing and other objectives, characteristics and advantages of the present invention will become apparent by the detailed description of a preferred embodiment as follows.

Figure 1:
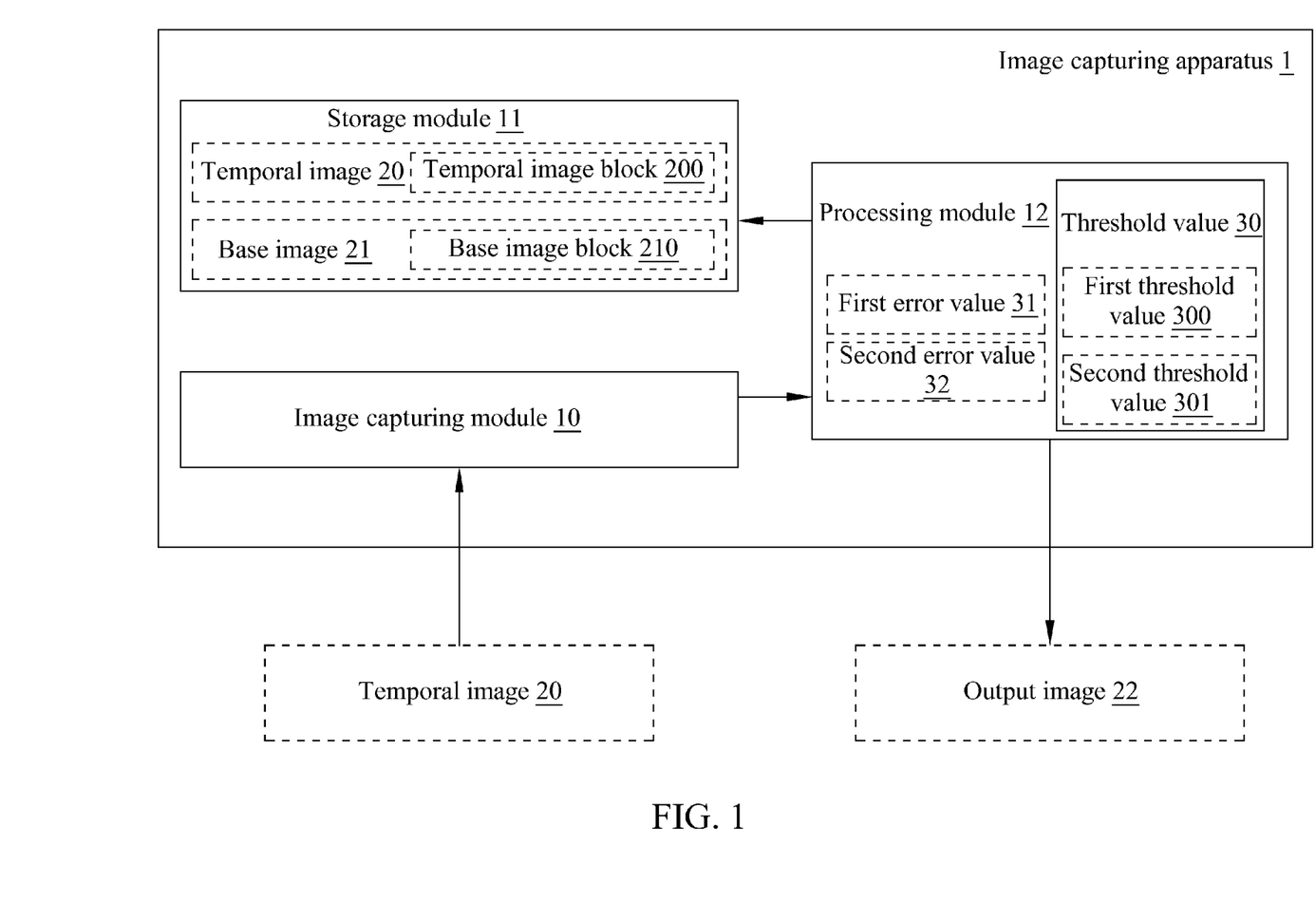
FIG. 1 is a block diagram of an image capturing apparatus of the present invention.

With reference to FIG. 1 for a block diagram of an image capturing apparatus of the present invention, the image capturing apparatus 1 comprises an image capturing module 10, a storage module 11 and a processing module 12. The image capturing module 10 comprises a light sensing element such as a complementary metal oxide semiconductor (CMOS) or a charge-coupled device (CCD), a lens and a lens module. The storage module 11 can be an embedded memory, an external memory card or a combination of both. The processing module 12 is electrically coupled to the image capturing module 10 and the storage module 11, and the processing module 12 is a central processing unit (CPU) or a micro processing unit (MPU). In a preferred embodiment of the present invention, the image capturing apparatus 1 can be a digital camera or a digital video camera.

The image capturing module 10 is provided for capturing a plurality of temporal images 20 and storing the temporal images 20 into the storage module 11. The processing module 12 sets one of the temporal images 20 as a base image 21, divides each temporal image 20 into a plurality of temporal image blocks 200, and divides the base image 21 into a plurality of base image blocks 210. The processing module 12 further determines whether or not the difference between each temporal image block 200 and each corresponding base image block 210 is smaller than a threshold value 30. If the difference between one of the temporal image blocks 200 and one of the corresponding base image block 210 is smaller than threshold value 30, the processing module 12 will perform an image combination of the temporal image block 200 with the corresponding base image block 210 to generate an output image 22. The threshold value 30 comprises a first threshold value 300 and a second threshold value 301.

In a preferred embodiment, the processing module 12 further performs a geometric alignment of each base image block 210 with each corresponding temporal image block 200 and calculates a first error value 31. If the first error value 31 is smaller than first threshold value 300, the processing module 12 will perform the image combination of the base image block 210 with the corresponding temporal image block 200. In another preferred embodiment, the processing module 12 further uses a histogram of each base image block 210 and each temporal image block 200 to determine whether or not a second error value 32 between each base image block 210 and each temporal image block 200 is smaller than a second threshold value 301. If the second error value 32 is smaller than the second threshold value 301, the processing module 12 will perform an image combination of the base image block 210 with the temporal image block 200. If the difference between one of the temporal image blocks 200 and one of the base image blocks 210 is greater than or equal to threshold value, the processing module 12 will compensate the brightness of the output image 22 at a corresponding position of the base image block 210 by a digital gain compensation method or a temporal interpolation method.

In certain conditions, the quality of the temporal image captured by the image capturing module 10 is poor, the difference of the temporal image block 200 and the base image block 210 is greater than or equal to the threshold value, and the processing module 12 will increase the brightness of the base image 21 and beautify the base image 21 to generate the output image 22. In this preferred embodiment, the output image 22 is preferably stored as a file in the storage module 11, and the temporal image 20 is preferably stored as data in the storage module 11. In addition, the output image 22 is preferably available for the viewing by users, but the temporal image 20 is preferably unavailable for the viewing by users.

Figure 2:
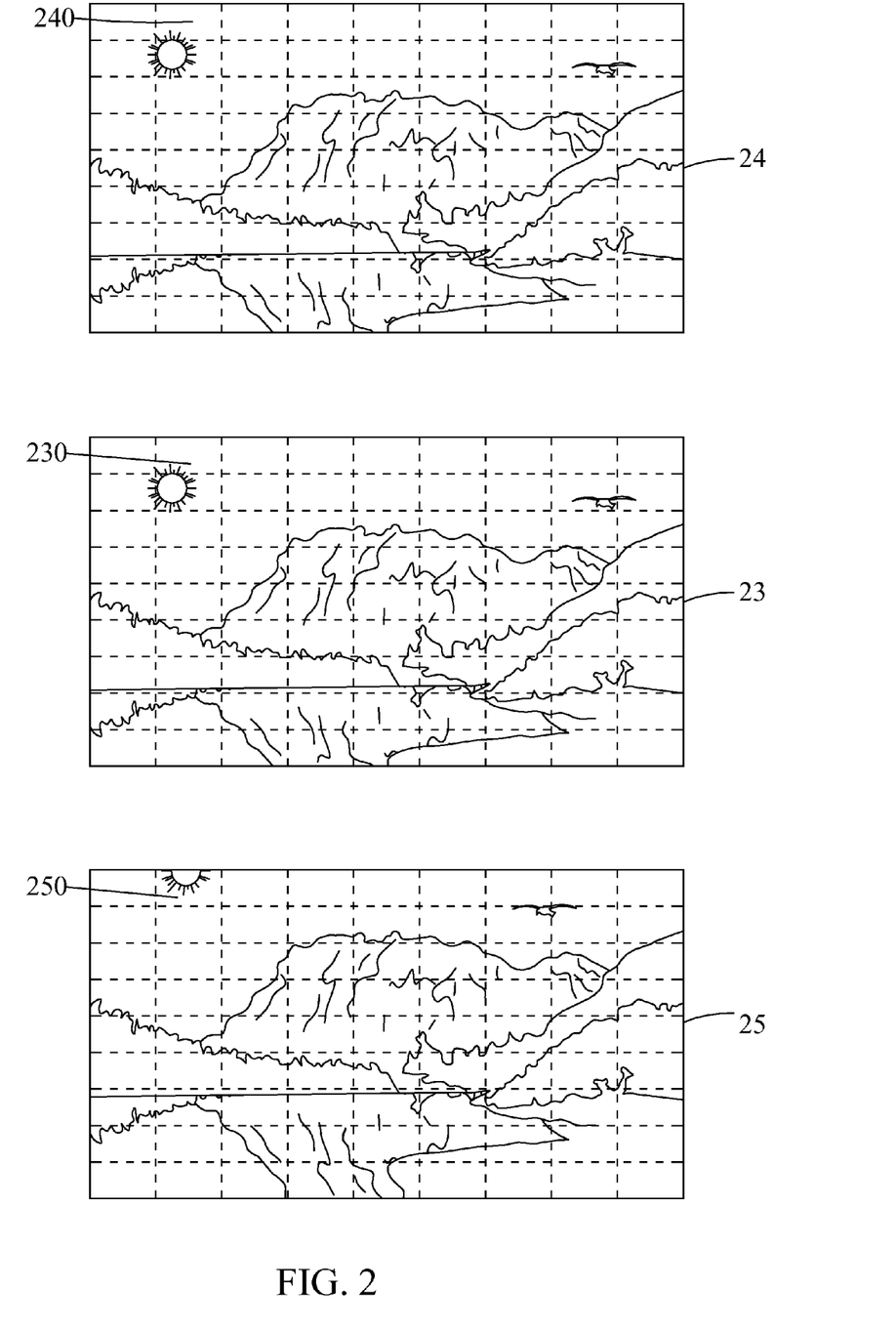
FIG. 2 is a schematic view of an image capturing apparatus in accordance with a first preferred embodiment of the present invention.

With reference to FIG. 2 for a schematic view of an image capturing apparatus in accordance with a first preferred embodiment of the present invention, the image capturing module 10 captures three consecutive temporal images, and the processing module 12 or a user selects one of the temporal images as a base image 23, and the remaining two images are the temporal images 24, 25 used for geometrically aligning with the base image 23 by means of small blocks. In FIG. 2, the content of the temporal image 25 has a much larger geometric difference than the base image 23, and such geometric difference may result in an image displacement caused by hand vibrations, or noises caused by a low ambient illumination, so that a good alignment cannot be achieved in the geometric alignment process. In this preferred embodiment, the temporal image 25 is generated after the camera is displaced vertically downward by a user's hand vibration, and thus half of the sun at the top of the photo is cut off, and many images of the lake at the bottom of the photo are captured. The processing module 12 divides the base image 23 and the temporal image 24, 25 into a plurality of small blocks (as indicated by the dotted lines in the figure), and the geometric alignment of the blocks is performed block by block.

In the geometric alignment process, the temporal image blocks 240, 250 are geometrically aligned with the base image block 230, and the processing module 12 calculates geometric transformation parameters for each of the temporal image blocks 240, 250 when they are aligned with the base image block 230, and the processing module 12 further generates a first error value 31 based on each of the geometric transformation parameters, and compares the first error value 31 with the first threshold value 300. If there is a big difference between the two, the alignment cannot be made precisely, and the error is too large. In the figure, the first error value 31 of the temporal image block 250 is produced after the geometric alignment of the base image block 230 takes place, and the geometric difference at edges of the photo is too large (half of the sun is cut off), so that the first error value 31 will exceed the first threshold value 300. Now, the processing module 12 determines that the geometric difference between the temporal image block 250 and the corresponding base image block 230 is relatively large. The temporal image block 250 and the corresponding base image block 230 are inapplicable for the following image combination procedure, so that the processing module 12 will not perform an image combination of the temporal image block 250 with the base image block 230. On the other hand, the first error value 31 produced by geometrically aligning the temporal image block 240 with the base image block 230 will be smaller than the first threshold value 300, since the geometric difference at the edges of the photo is relatively small. Now, the processing module 12 determines that the geometric difference between the temporal image block 250 and the corresponding base image block 230 is relatively small, and the temporal image block 250 and the corresponding base image block 230 are applicable for the following image combination procedure, so that the processing module 12 will perform an image combination of the temporal image block 240 with the base image block 230. The blocks are compared one by one, and the processing module 12 will generate an output image 22 after the image combination takes place. Since the output image 22 has no combination of the temporal image block 250 at the position of the base image block 230, the brightness of the output image is insufficient. In other words, the output image 22 of this preferred embodiment should have the brightness of three temporal image blocks 250 at the corresponding position of the base image block 230, but one of the temporal image blocks 250 is not combined. As a result, the output image 22 has only ⅔ of the brightness left at the corresponding position of the base image block 230 after the image combination takes place. To overcome this problem, the processing module 12 increases the brightness of the output image by ⅓ at the corresponding position of the base image block 230 by the digital gain compensation method to achieve the original brightness of the output image preset by the user. The processing module 12 also can use the brightness of the base image block 230 and the temporal image block 240 as a standard to predict the brightness value of the temporal image block 250 by a temporal interpolation method, and compare such brightness value to adjust the brightness of the output image at the corresponding position of the base image block 230. Of course, persons ordinarily skilled in the art should understand that the methods of adjusting the brightness of the output image are not limited to the aforementioned two methods only. These methods are just used for the purpose of illustrating the present invention, In some situations, the quality of all temporal images (except the base image) captured by the image capturing module 10 are low. In other words, the difference of all temporal image blocks and base image blocks is greater than or equal to the threshold value, and thus the image combination will not be performed for these temporal images. Now, the processing module 12 will increase the brightness of the base image (by the digital gain compensation method) and then beautify the base image to generate and output the output image.

Figure 3:
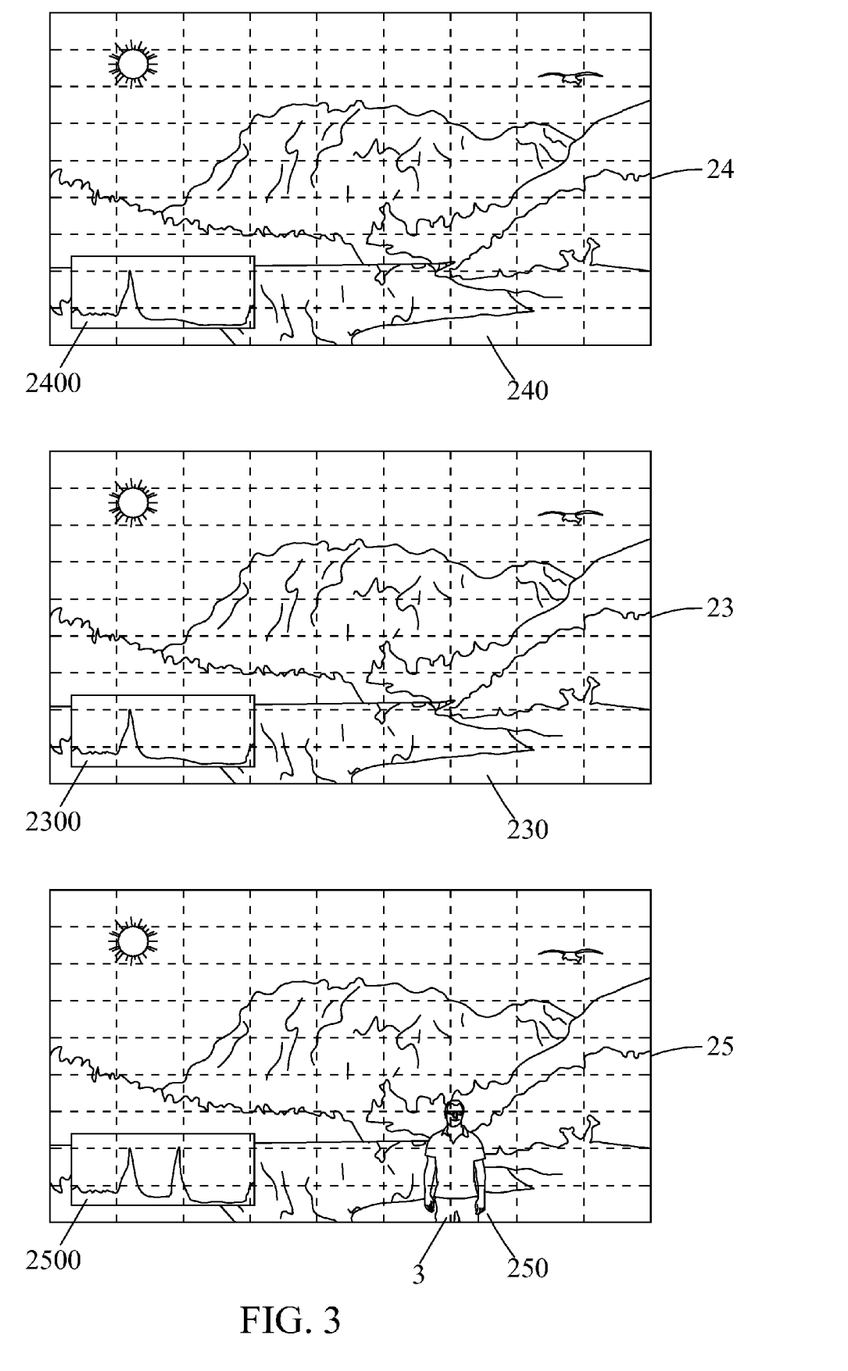
FIG. 3 is a schematic view of an image capturing apparatus in accordance with a second preferred embodiment of the present invention.

With reference to FIG. 3 for a schematic view of an image capturing apparatus in accordance with a second preferred embodiment of the present invention, the image capturing module 10 captures three consecutive temporal images, and the processing module 12 or a user selects one of the temporal images as a base image 23, and thus the remaining two temporal images can be provided for analyzing and comparing the contents of the temporal images 24, 25 with the base image 23 by a histogram. In FIG. 3, the content of the temporal image 25 has a big difference from the base image 24, since a pedestrian 3 walks into the image capturing range of the image capturing module 10 when the user is taking the photo, so that the temporal image 25 in the color histogram 2500 of the temporal image block 250 is very different from the base image block 230 of the corresponding base image 23 in the color histogram 2300, indicating the contents of these two images are different. Now, the processing module 12 determines that the difference between the image content of the temporal image block 250 and the image content of the base image block 230 is greater, and thus the temporal image block 250 and the base image block 250 are inapplicable for the following image combination procedure, and the processing module 12 will not perform the image combination of the temporal image block 250 with the corresponding base image block 230. On the other hand, the difference between the image content of the temporal image 24 and the image content of the base image 24 is relatively small, so that the difference between the temporal image 24 in the color histogram 2400 of the temporal image block 240 and the corresponding base image 23 in the color histogram 2300 of the base image block 230 is very small, indicating that the image contents of the two are almost the same. Now, the processing module 12 determines that the difference between the image content of the temporal image block 240 and the image content of the base image block 230 is not large, and the temporal image block 240 and the base image block 230 are applicable for the following image combination procedure, and the processing module 12 will perform the image combination of the temporal image block 240 with the corresponding base image block 230. The blocks are compared one by one, and the processing module 12 generates an output image after the image combination takes place. The processing module 12 further compensates the brightness of the output image by the aforementioned brightness compensation methods, and the brightness compensation methods including the digital gain compensation method and the temporal interpolation method will not be described here again.

However, those ordinarily skilled in the art should be able to understand and determine that the methods for determining the difference between each temporal image and the base image are not limited to one of the aforementioned two methods only, but a combination of the two methods can be used as well. Of course, these two methods are used for the purpose of illustrating the present invention only, and any other equivalent method can be used in the present invention.

In addition, the division of the temporal image or the base image by the control module 12 is not limited to the division of the whole image only, but a division can take place within a range near the focal point, or users can select an area of interest from the image capturing apparatus for the division, or the image capturing apparatus can divide the image of an independent object (such as an image of a face defined after a face recognition) automatically detected by the image capturing apparatus. In other words, the way of dividing the temporal image or the base image of the present invention is not limited to the aforementioned methods only, and users have a greater flexibility to select their desired level for the effect (including a partial combination and a whole combination) of outputting the output images.

Figure 4:
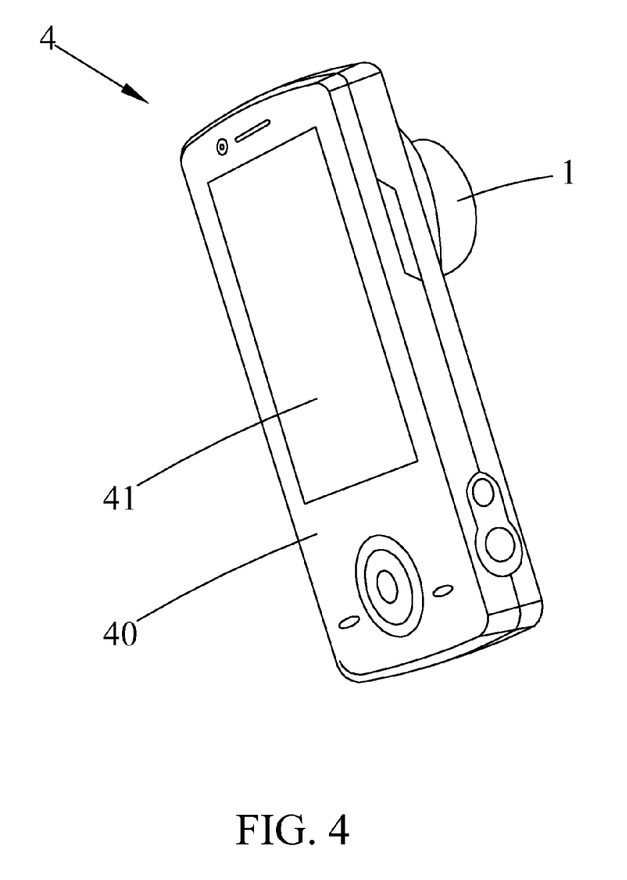
FIG. 4 is a schematic view of an electronic apparatus of the present invention.

With reference to FIG. 4 for a schematic view of an electronic apparatus of a preferred embodiment of the present invention, the electronic apparatus 4 comprises a main body 40, an input device 41, and an image capturing apparatus 1, wherein the image capturing apparatus 1 is installed onto the main body 40 and electrically coupled to the input device 41. The image capturing apparatus 1 comprises an image capturing module, a storage module and a processing module, and the image capturing apparatus 1 is the same as that described above, and thus will not be described here again. However, it is noteworthy to point out that the electronic apparatus 4 of the present invention is a mobile handheld device such as a digital camera, a multimedia player with a photographic function, a mobile phone with a photographic function, a smart phone, a navigator, a tablet personal computer with a photographic function or a personal digital assistant (PDA).

In this preferred embodiment, the electronic apparatus 4 of the present invention is a smart phone embedded into the image capturing apparatus 1 for taking photos, so that a user can use the input device 41 such as a touch screen or a press key of the smart phone to take a photo, and the electronic apparatus 4 will filter the blocks of the images taken and perform the image combination to improve the vibration reduction effect and the clarity of the output image. The smart phone of this preferred embodiment is used for illustrating the present invention, but not intended for limiting the scope of the present invention, and those ordinarily skilled in the art can replace the image capturing apparatus of the invention by any other equivalent image apparatus.

The concept of the image capturing method of the present invention will become apparent with the illustration with the following flow charts.

Figure 5:
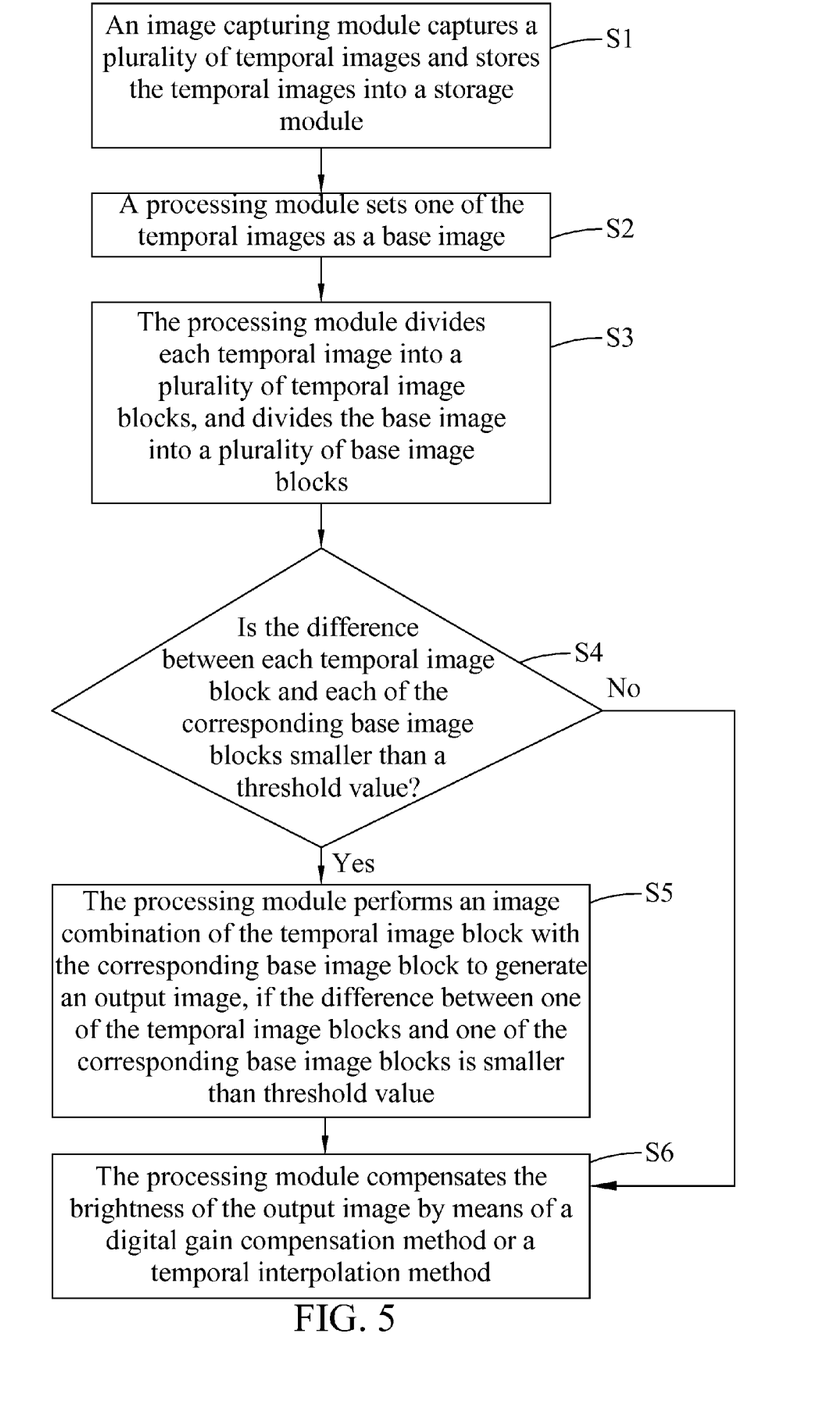
FIG. 5 is a first flow chart of an image capturing method of the present invention.

With reference to FIG. 5 for a first flow chart of an image capturing method of the present invention, the image capturing method is applicable for an image capturing apparatus, and the image capturing apparatus comprises an image capturing module, a storage module and a processing module, and the image capturing method comprises the following steps:

(S1) An image capturing module captures a plurality of temporal images and stores the temporal images into a storage module;

(S2) A processing module sets one of the temporal images as a base image;

(S3) The processing module divides each temporal image into a plurality of temporal image blocks, and divides the base image into a plurality of base image blocks;

(S4) The processing module determines whether or not the difference between each temporal image block and each of the corresponding base image blocks is smaller than a threshold value;

(S5) The processing module performs an image combination of the temporal image block with the corresponding base image block to generate an output image, if the difference between one of the temporal image blocks and one of the corresponding base image blocks is smaller than threshold value; and (S6) The processing module compensates the brightness of the output image by means of a digital gain compensation method or a temporal interpolation method.

The steps (S4) and (S5) are repeated until all temporal image block and base image blocks are compared.

The step (S4) further comprises the following steps, if the processing module determines that the differences between all temporal image blocks and the corresponding base image blocks are greater than or equal to a threshold value:

(S40) The processing module increases the brightness of the base image; and (S41) The processing module beautifies the base image to generate the output image.

Figure 6:
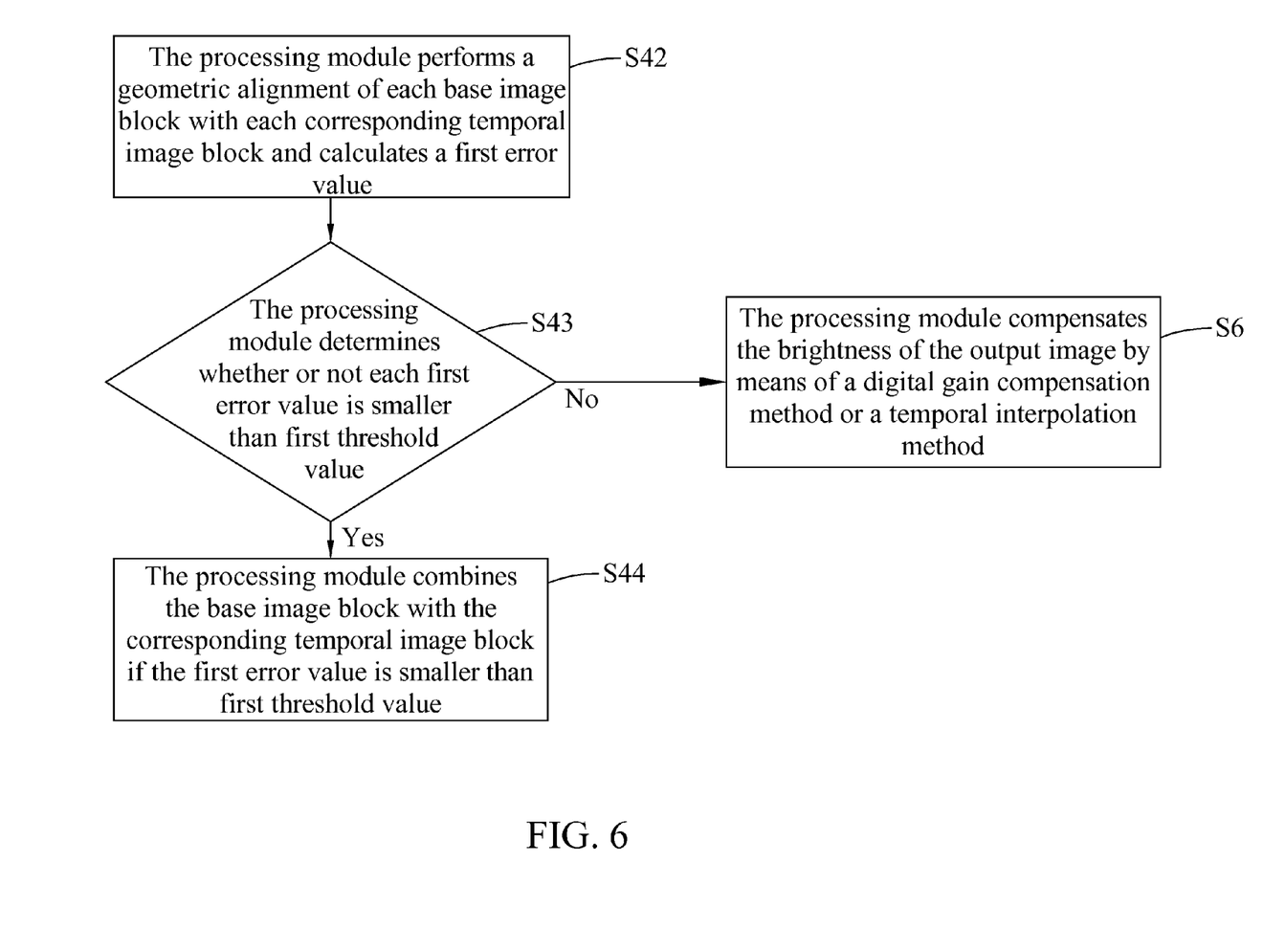
FIG. 6 is a second flow chart of an image capturing method of the present invention.

With reference to FIG. 6 for a second flow chart of an image capturing method of the present invention, the Step (S4) further comprises the following steps:

(S42) The processing module performs a geometric alignment of each base image block with each corresponding temporal image block and calculates a first error value;

(S43) The processing module determines whether or not each first error value is smaller than first threshold value; and (S44) The processing module combines the base image block with the corresponding temporal image block if the first error value is smaller than first threshold value.

In the step (S43), if the first error value is greater than or equal to the first threshold value, the step (S6) will be carried out. Similarly, the steps (S42) to (S44) are repeated until all temporal image blocks and base image blocks are compared.

Figure 7:
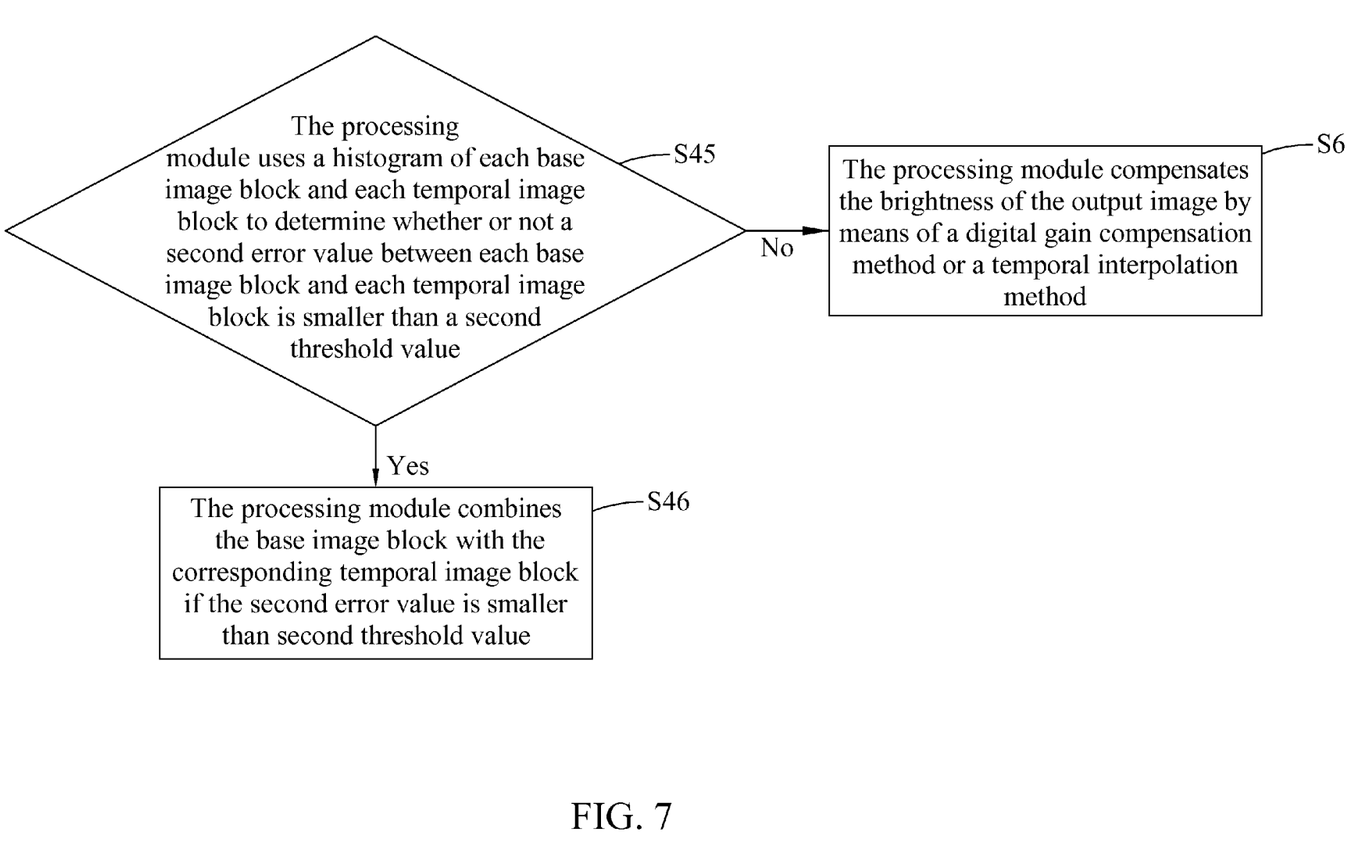
FIG. 7 is a third flow chart of an image capturing method of the present invention.

With reference to FIG. 7 for a third flow chart of an image capturing method of the present invention, the Step (S4) further comprises the following steps:

(S45) The processing module uses a histogram of each base image block and each temporal image block to determine whether or not a second error value between each base image block and each temporal image block is smaller than a second threshold value; and (S46) The processing module combines the base image block with the corresponding temporal image block if the second error value is smaller than second threshold value.

In the step (S45), if the second error value is greater than or equal to second threshold value, the step (S6) will be carried out. Similarly, the steps (S45) and (S46) are repeated until all temporal image blocks and base image blocks are compared.

The step (S4) solely includes the steps (S42) to (S44) or the step (S45) and (S46), or combined the two, and the present invention has on particular limitation on adopting these steps.

The image capturing method of the present invention and its implementation are described in the image capturing apparatus of the present invention, and thus will not be described again here.

In summation of the description above, the electronic apparatus, the image capturing apparatus and the method thereof geometrically align the plurality of temporal images by means of small blocks, and selects any temporal image block of a poor quality according to the alignment error, in order to improve the clarity of the output image after the image combination takes place. In addition, the present invention can analyze the histogram of each block in each temporal image, and any temporal image block with a poor quality is filtered according to the error values, and thus the present invention can effectively overcome the problem of outputting poor images caused by the image combination of the prior art.

What is claimed is:

1. An image capturing apparatus, comprising:
an image capturing module, for capturing a plurality of temporal images; and a processing module, for setting one of the temporal images as a base image, dividing each of the temporal images into a plurality of temporal image blocks, and dividing the base image into a plurality of base image blocks, and determining whether or not a difference between each of the temporal image blocks and each of the corresponding base image blocks is smaller than a threshold value;
wherein the processing module performs an image combination by using the temporal image block and the corresponding base image block to generate an output image when the difference between one of the temporal image blocks and one of the base image blocks is smaller than the threshold value, and the processing module further performs a geometric alignment of each of the base image blocks with each of the corresponding temporal image blocks, and calculates a first error value, such that the processing module combines the base image block with the corresponding temporal image block if the first error value is smaller than the threshold value.

2. The image capturing apparatus of claim 1, wherein the threshold value includes a second threshold value, and the processing module further uses a histogram of each of the base image blocks and each of the corresponding temporal image blocks to determine whether or not a second error value between each of the base image blocks and each of the corresponding temporal image blocks is smaller than the second threshold value, such that, the processing module combines the base image block with the corresponding temporal image block if the second error value is smaller than the second threshold value.

3. The image capturing apparatus of claim 1, wherein the processing module compensates the brightness of the output image by a digital gain compensation manner or a temporal interpolation manner if difference between one of the temporal image blocks and one of the corresponding base image blocks is greater than or equal to the threshold value.

4. An image capturing method, comprising the steps of:
capturing a plurality of temporal images by an image capturing module;
setting one of the temporal images as a base image by a processing module;
dividing each of the temporal images into a plurality of temporal image blocks and dividing the base image into a plurality of base image blocks by the processing module;
performing a geometric alignment of each of the base image blocks and each of the corresponding temporal image block, and calculating a first error value by the processing module;
determining whether or not the difference between one of the temporal image blocks and one of the corresponding base image blocks is smaller than a threshold value by the processing module and determining whether or not each of the first error values is smaller than the threshold value by the processing module; and
when the difference between one of the temporal image blocks and one of the corresponding f base image blocks is smaller than the threshold value, the processing module performs an image combination of the temporal image block with the base image block to generate an output image, and combining the base image block with the corresponding temporal image block by the processing module if the first error value is smaller than the threshold value.

5. The image capturing method of claim 4, wherein the threshold value includes a second threshold value, and the image capturing method further comprises the steps of:
using a histogram of each of the base image blocks and each of the corresponding temporal image blocks to determine whether or not a second error value between each of the base image blocks and each of the temporal image blocks is smaller than the second threshold value by the processing module; and
combining the base image block with the corresponding temporal image block by the processing module, if the second error value is smaller than the second threshold value.

6. The image capturing method of claim 4, further comprising the step of:
compensating the brightness of the output image by a digital gain compensation manner or a temporal interpolation manner by the processing module, if the difference between one of the temporal image blocks and one of the base image blocks is greater than or equal to the threshold value.

7. An electronic apparatus, comprising:
a main body;
an image capturing apparatus, installed in the main body for capturing a plurality of temporal images; and
a processing module, installed in the main body for setting one of the temporal images as a base image, dividing each of the temporal images into a plurality of temporal image blocks, and dividing the base image into a plurality of base image blocks, and determining whether or not a difference between each of the temporal image blocks and each of the corresponding base image blocks is smaller than a threshold value;
wherein the processing module performs an image combination by using the temporal image block and the corresponding base image block to generate an output image when the difference between one of the temporal image blocks and one of the base image blocks is smaller than the threshold value, and the processing module further performs a geometric alignment of each of the base image blocks with each of the corresponding temporal image blocks, and calculates a first error value, such that if the first error value is smaller than the threshold value, the processing module combines the base image block with the corresponding temporal image block.

8. The electronic apparatus of claim 7, the electronic apparatus is a digital camera, a mobile phone with a photographic function, a personal digital assistant (PDA) with a photographic function, or a tablet personal computer with a photographic function.

9. The electronic apparatus of claim 7, wherein the threshold value includes a second threshold value, and the processing module further uses a histogram of each of the base image blocks and each of the corresponding temporal image blocks to determine whether or not a second error value between each of the base image blocks and each of the corresponding temporal image blocks is smaller than the second threshold value, such that the processing module combines the base image block with the corresponding temporal image block if the second error value is smaller than the second threshold value.

10. The electronic apparatus of claim 7, wherein the processing module compensates the brightness of the output image by a digital gain compensation manner or a temporal interpolation manner if one of the temporal image blocks and one of the corresponding base image blocks have a difference greater than or equal to the threshold value.

\* \* \* \* \*